United States Patent
Yamada et al.

[11] Patent Number: 5,825,997
[45] Date of Patent: Oct. 20, 1998

[54] APPARATUS FOR PRODUCING A THREE DIMENSIONAL IMAGE FROM A TWO DIMENSIONAL IMAGE

[75] Inventors: Teruhiro Yamada, Hirakata; Takahisa Ando, Kadoma; Tetsuya Enomoto, Hirakata, all of Japan

[73] Assignee: Sanyo Electric Co., Ltd., Osaka, Japan

[21] Appl. No.: 561,422

[22] Filed: Nov. 21, 1995

[30] Foreign Application Priority Data

Dec. 28, 1994 [JP] Japan .................................. 6-327691

[51] Int. Cl.⁶ .................................................. H04N 13/00
[52] U.S. Cl. ................................................................ 395/119
[58] Field of Search ...................................... 395/119, 137; 359/462, 463, 464, 619; 348/40, 42, 47, 48, 51, 52, 589, 563; 378/41, 42

[56] References Cited

U.S. PATENT DOCUMENTS

| | | | |
|---|---|---|---|
| 4,956,705 | 9/1990 | Wright | 348/50 |
| 5,014,128 | 5/1991 | Pritchard et al. | 348/42 |
| 5,049,987 | 9/1991 | Hoppenstein | 348/48 |
| 5,090,038 | 2/1992 | Asahina | 378/41 |
| 5,155,750 | 10/1992 | Klynn et al. | 348/46 |
| 5,581,665 | 12/1996 | Sugiura et al. | 395/137 X |
| 5,588,097 | 12/1996 | Ono et al. | 395/137 |

OTHER PUBLICATIONS

Patent Abstracts of Japan, vol. 14, No. 400 (P–1098), Aug. 29, 1990 & JP–A–02 151849, Jun. 11, 1990.

*Primary Examiner*—Phu K. Nguyen
*Assistant Examiner*—Cliff N. Vo
*Attorney, Agent, or Firm*—Nikaido Marmelstein, Murray & Oram LLP

[57] ABSTRACT

Rotating image data of a subject which is composed of two-dimensional image data for each predetermined angle of rotation of the subject is stored in storing device. Reference image data and image data delayed from the reference image data are selected out of the two-dimensional image data for each predetermined angle of rotation of the subject which are stored in the storing device, and are successively read out. One of the reference image data and the delayed image data which are read out is output as a left eye image signal, and the other image data is output as a right eye image signal.

5 Claims, 7 Drawing Sheets

| 2D IMAGE DATA (0°) |
|---|
| 2D IMAGE DATA (5°) |
| 2D IMAGE DATA (10°) |
| 2D IMAGE DATA (15°) |
| 2D IMAGE DATA (20°) |
| ⋮ |
| 2D IMAGE DATA (345°) |
| 2D IMAGE DATA (350°) |
| 2D IMAGE DATA (355°) |

APPARATUS FOR PRODUCING A THREE DIMENSIONAL IMAGE FROM A TWO DIMENSIONAL IMAGE

BACKGROUND OF THE INVENTION

1. Field of the Invention

The present invention relates to a three-dimensional (3D) image producing apparatus and a three-dimensional (3D) image producing method.

2. Description of the Prior Art

Almost all types of 3D image software used for a 3D image display system, which has been recently in the news, are particularly produced for the 3D display system. The 3D image software is generally recorded by picking up a left eye image and a right eye image using two cameras. The left eye image and the right eye image which are recorded on the 3D image software are displayed overlapped with each other on a display device almost simultaneously. The left eye image and the right eye image, which are displayed overlapped with each other, are separately incident on the left eye and the right eye of a viewer, respectively, whereby the viewer recognizes 3D images.

A lot of types of 2D image software currently exist. If a 3D image can be produced from the 2D image software, therefore, time and labor required to produce 3D image software having the same content as that of the existing 2D image software are saved.

As a result, the applicant of the present invention has already developed an apparatus for converting 2D images into 3D images (hereinafter referred to as a 2D/3D image converter). The principle of converting 2D images into 3D images by the 2D/3D image converter will be described. Specifically, in the case of a 2D image in which an object moving from the left to the right is projected, the original 2D image is taken as a right eye image, and an image which is several fields preceding the left eye image is taken as a right eye image. Consequently, binocular parallax occurs between the left eye image and the right eye image. By displaying both the images on a screen almost simultaneously, therefore, the moving object is raised forward against the background.

A right eye image signal, delayed from a left eye image signal, is produced by writing the original 2D image into a plurality of field memories and reading out an image signal from the field memory, storing a 2D image, corresponding to a field delay indicating how many fields there are from a field of the left eye image signal to a field of the right eye image signal. In addition, the field delay is determined on the basis of a motion vector detected from the left eye image signal.

In the above described 2D/3D image converter developed by the applicant of the present invention, a plurality of field memories are required to produce a delayed image, and a circuit for detecting a motion vector is required to determine the suitable delay.

SUMMARY OF THE INVENTION

An object of the present invention is to provide a 3D image producing apparatus of simple construction and a 3D image producing method.

In the specification, a rotating image is an image obtained by imaging a subject while rotating one of an imaging device and the subject or its equivalent image.

A 3D image producing apparatus according to the present invention is characterized by comprising storing means for storing rotating image data of a subject which is composed of 2D image data for each predetermined angle of rotation of the subject, reading means for selecting reference image data and image data delayed from the reference image data out of the 2D image data for each predetermined angle of rotation of the subject which are stored in the storing means and successively reading out the selected image data, and outputting means for outputting one of the reference image data and the delayed image data which are read out as a left eye image signal and outputting the other image data as a right eye image signal.

A 3D image producing method according to the present invention is characterized by comprising the steps of storing in storing means rotating image data of a subject which is composed of 2D image data for each predetermined angle of rotation of the subject, selecting reference image data and image data delayed from the reference image data out of the 2D image data for each predetermined angle of rotation of the subject which are stored in the storing means and successively reading out the selected image data, and outputting one of the reference image data and the delayed image data which are read out as a left eye image signal and outputting the other image data as a right eye image signal.

The rotating image data of the subject which is composed of the 2D image data for each predetermined angle of rotation of the subject is stored in the storing means. The reference image data and the image data delayed from the reference image data are selected out of the 2D image data for each predetermined angle of rotation of the subject which are stored in the storing means, and are successively read out. One of the reference image data and the delayed image data which are read out is output as a left eye image signal, and the other image data is output as a right eye image signal.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Referring now to the drawings, description is made of an embodiment of the present invention.

Figure 6:
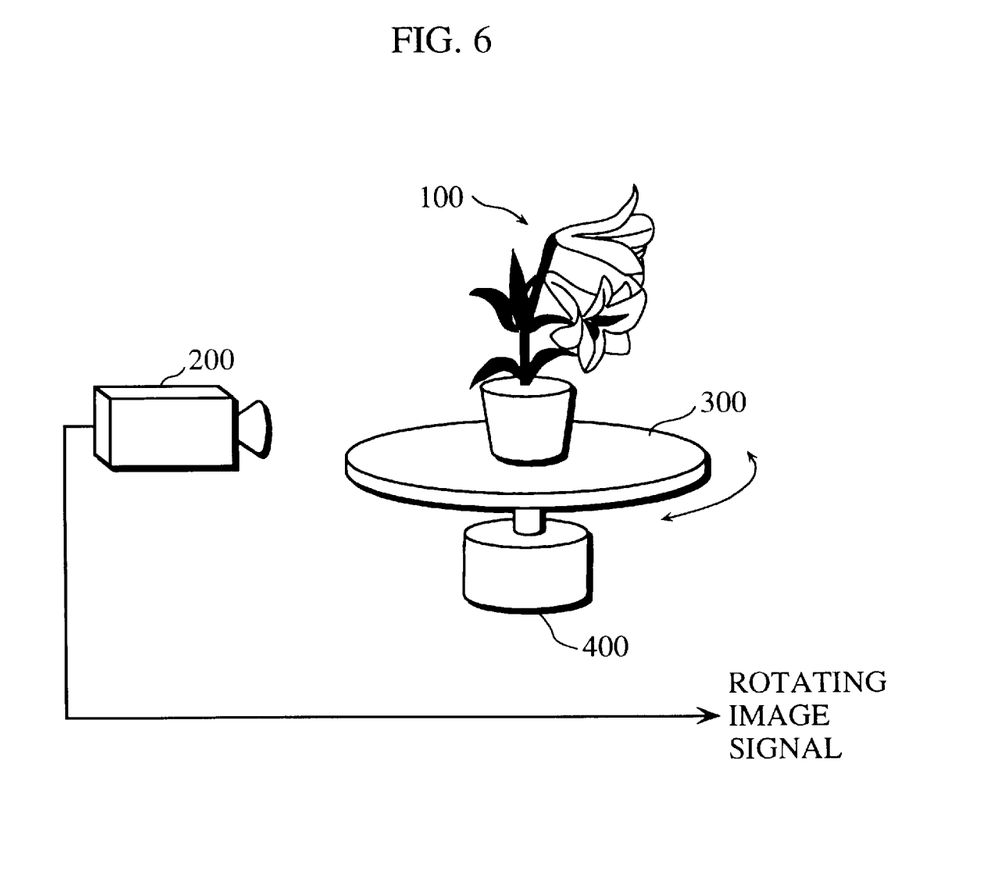
FIG. 6 is a typical diagram for explaining a method of producing a rotating image signal.

In an example shown in FIG. 6, a rotating image signal (a 2D image signal) of a subject 100 is obtained by imaging the subject 100 using a video camera 200 while rotating the subject 100. The subject 100 is disposed on a rotating disc 300 rotated by a motor 400. The rotating image signal (the 2D image signal) is output from the video camera 200.

Figure 7:
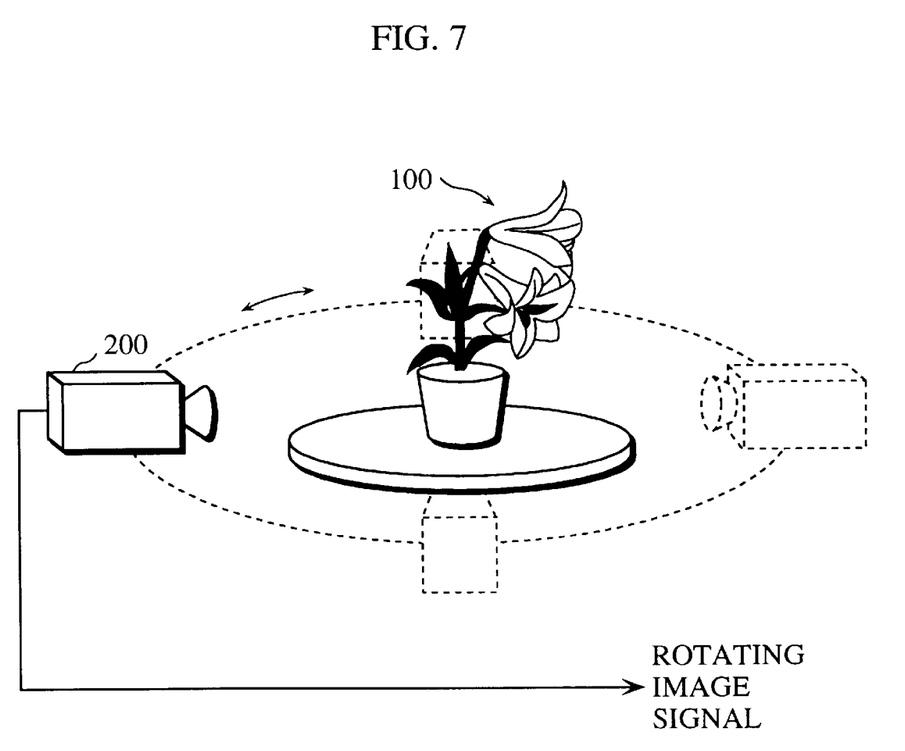
FIG. 7 is a typical diagram for explaining another method of producing a rotating image signal.

In an example shown in FIG. 7, a rotating image signal (a 2D image signal) of a subject 100 is obtained by imaging the subject 100 using a video camera 200 while rotating the video camera 200 so as to move around the subject 100. The video camera 200 is rotated by a rotating mechanism (not shown). The rotating image signal (the 2D image signal) is output from the video camera 200.

A rotating image of a subject may be produced by processing a cross-sectional image of the subject obtained by a CT device such as an X-ray CT (computer tomography) or an NMR (nuclear magnetic resonance).

Figure 1:
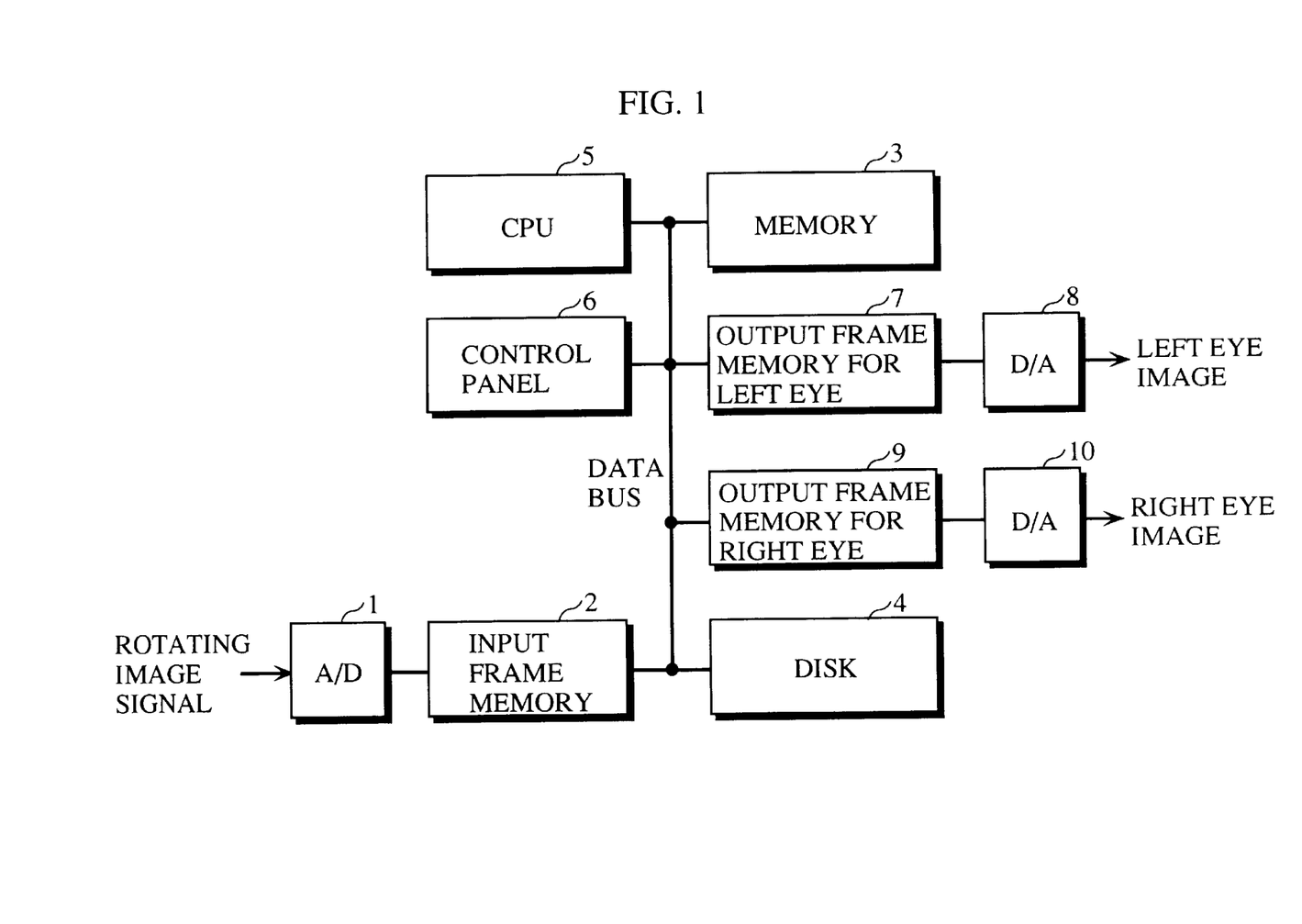
FIG. 1 is a block diagram showing the electrical construction of a 3D image producing apparatus.

FIG. 1 illustrates the electrical construction of a 3D image producing apparatus.

The 3D image producing apparatus is controlled by a CPU (Central Processing Unit) 5. A control panel 6, an input frame memory 2, a memory 3, an output frame memory for left eye 7, an output frame memory for right eye 9 and a disk are connected to the CPU 5 through a data bus.

Figure 2:
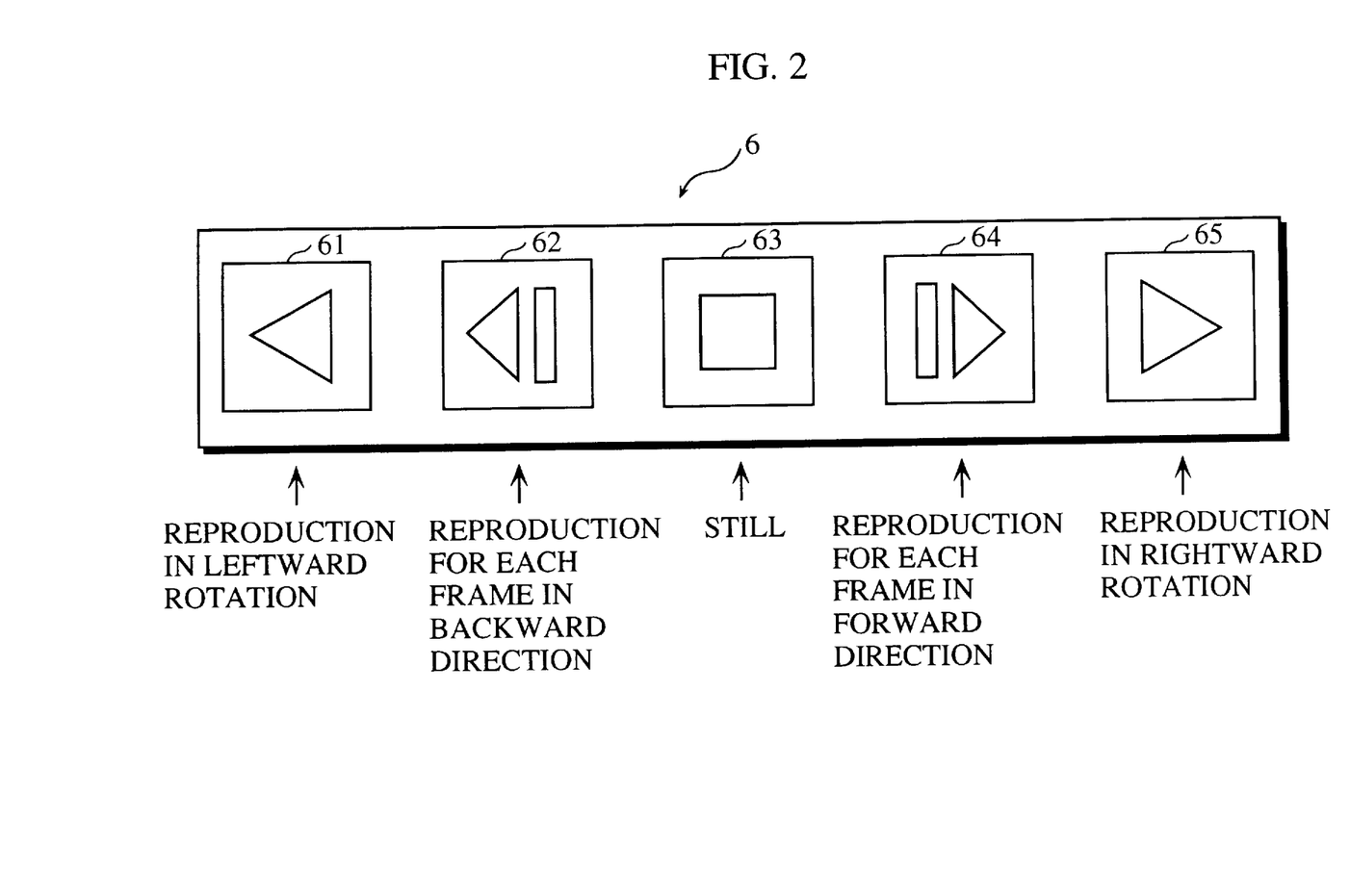
FIG. 2 is a typical diagram showing a control panel.

The control panel 6 is provided with a key 61 for making reproduction in backward rotation (hereinafter referred to as a backward rotation reproducing key), a key 62 for intermittently making reproduction for each frame in the backward direction 62, a key 63 for displaying a still image (hereinafter referred to as a still key), a key 64 for intermittently making reproduction for each frame in the forward direction, a key 65 for making reproduction in forward rotation (hereinafter referred to as a forward rotation reproducing key) 65, and the like, as shown in FIG. 2.

A rotating image signal (a 2D image signal) corresponding to one rotation which is obtained from the video camera 200 is input to an analog-to-digital (A/D) converter 1. The rotating image signal inputted to the A/D converter 1 is converted into a digital signal, and the digital signal is then stored in the memory 3 through the input frame memory 2.

Figure 3:
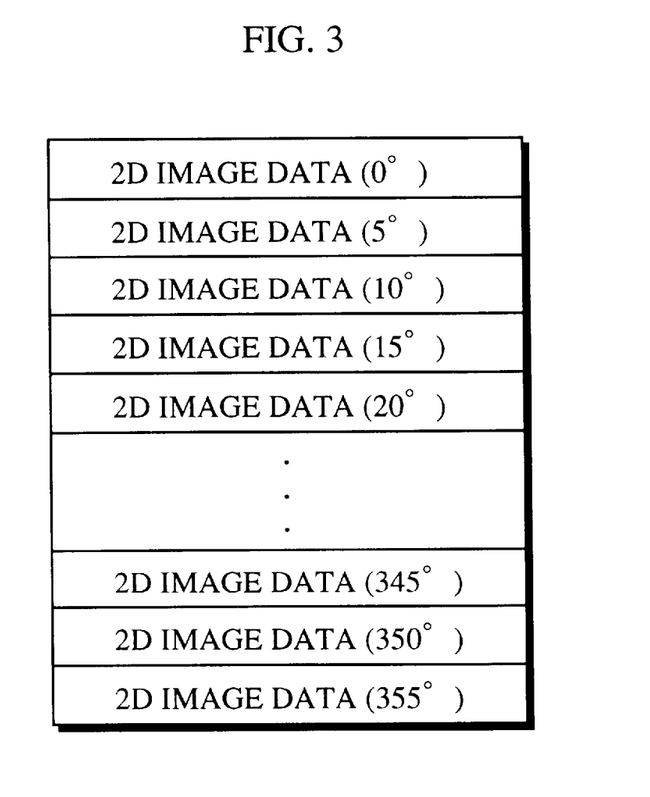
FIG. 3 is a typical diagram showing rotating image data corresponding to one rotation which is stored in a memory 3.

The rotating image data corresponding to one rotation which is stored in the memory 3 is illustrated in FIG. 3. In this example, the rotating image data is rightward rotating image data of a subject. Further, the rotating image data corresponding to one rotation is composed of 2D image data of the subject for each angle of rotation of 5°.

The disk 4 is provided so as to store the rotating image data stored in the memory 3.

Description is now made of an operation in a case where the rightward rotation reproducing key 65 on the control panel 6 is depressed in a state where the rotating image data (rightward rotating image data) corresponding to one rotation is stored in the memory 3.

Figure 4:
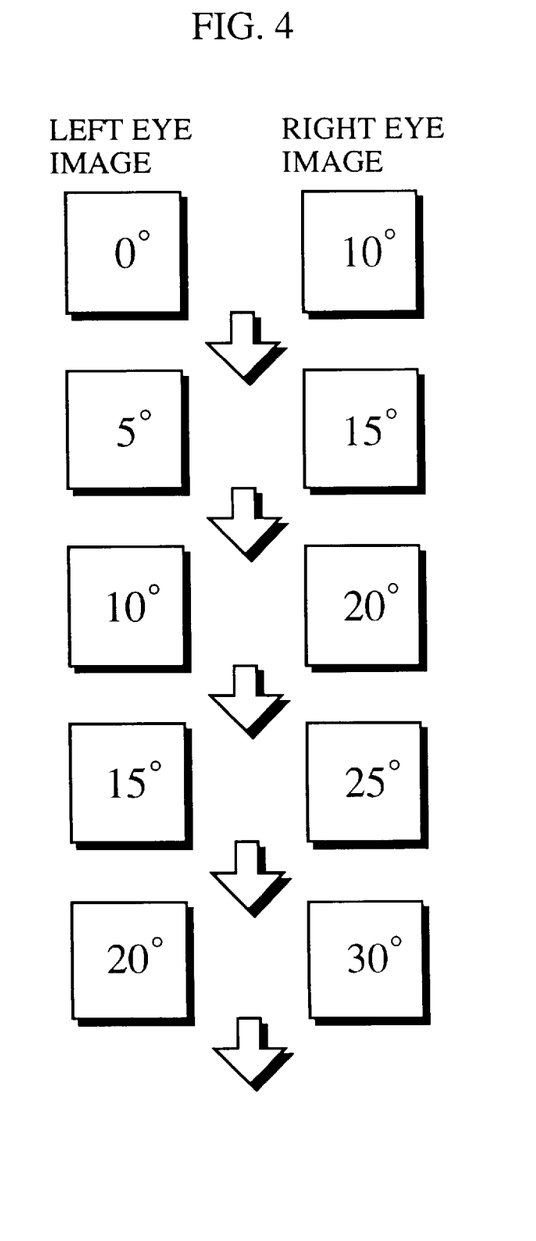
FIG. 4 is a typical diagram showing the order of frames which are outputted as a left eye image and a right eye image in a case where reproduction in rightward rotation is made.

When the rotating image data is the rightward rotating image data and the direction of reproduction is the direction of rightward rotation, reference image data is used as a right eye image signal, and image data delayed from the reference image data is used as a left eye image signal. It is assumed that image data delayed by an angle of rotation of 10° from the reference image data is used as delayed image data. In this case, the order of frames constituting each of the left eye image signal and the right eye image signal which are output from the 3D image producing apparatus is as shown in FIG. 4.

2D image data corresponding to a position at an angle of rotation of 10° is read out from the memory 3 as reference image data, and is sent to the output frame memory for right eye 9. In addition, 2D image data corresponding to a position at an angle of rotation of 0° is read out as delayed image data, and is sent to the output frame memory for left eye 7.

The 2D image data corresponding to the position at an angle of rotation of 10° which is stored in the output frame memory 9 is read out at predetermined speed, and is converted into an analog right eye image signal by a digital-to-analog (D/A) converter 10. On the other hand, the 2D image data corresponding to the position at an angle of rotation of 0° which is stored in the output frame memory 7 is read out at predetermined speed, and is converted into an analog left eye image signal by a D/A converter 8. The right eye image signal and the left eye image signal are sent to a 3D display device (not shown). Consequently, a 3D image is presented by the 3D display device.

2D image data corresponding to a position at an angle of 15° is read out from the memory 3 as reference image data, and is sent to the output frame memory for right eye 9. In addition, 2D image data corresponding to a position at an angle of 5° is read out as delayed image data, and is sent to the output frame memory for left eye 7.

The 2D image data corresponding to the position at an angle of rotation of 15° which is stored in the output frame memory 9 is read out at predetermined speed, and is converted into an analog right image signal by the D/A converter 10. On the other hand, the 2D image data corresponding to the position at an angle of rotation of 5° which is stored in the output frame memory 7 is read out at predetermined speed, and is converted into an analog left eye image signal by the D/A converter 8. The right eye image signal and the left eye image signal are sent to a 3D display device (not shown).

Reference image data and delayed image data are read out from the memory 3 for each predetermined time period, are converted into analog signals, after which the analog signals are sent to the 3D display device.

Specifically, in this case, an address from which the delayed image data (the left eye image signal) is read out for each predetermined time period becomes A (n+5°) when the preceding address from which the delayed image data is read out is taken as A (n°). In addition, an address from which the reference image data (the right eye image signal) is read out for each predetermined time period becomes an address which is an angle of 10° ahead of the address from which the delayed image data is read out.

Figure 5:
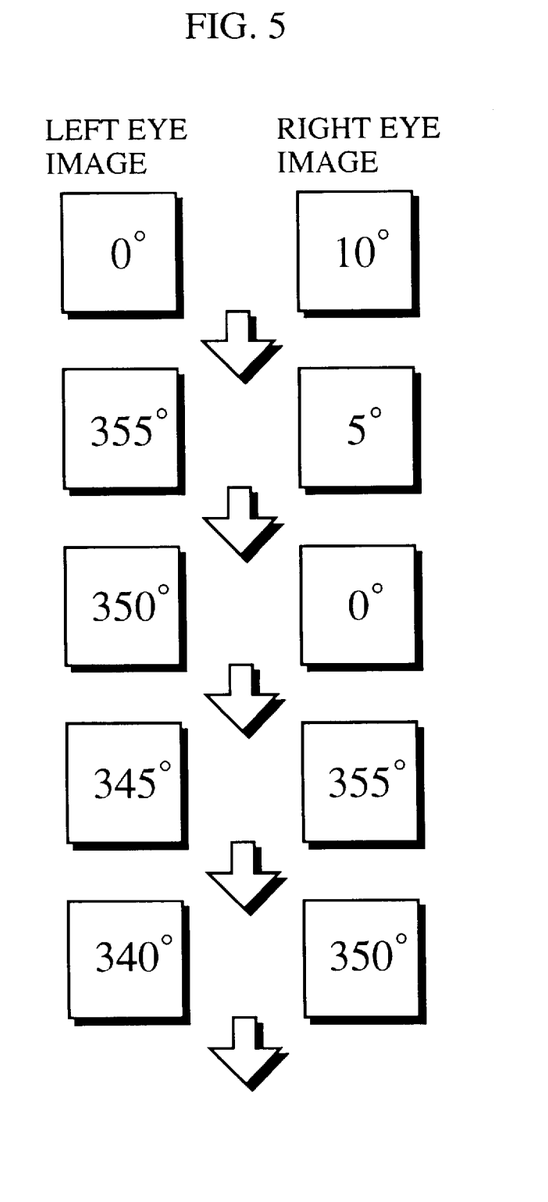
FIG. 5 is a typical diagram showing the order of frames which are outputted as a left eye image and a right eye image in a case where reproduction in leftward rotation is made.

When the rotating image data is the rightward rotating image data and the direction of reproduction is the direction of leftward rotation, reference image data is used as a left eye image signal, and image data delayed from the reference image data is used as a right eye image signal. It is assumed that image data delayed by an angle of rotation of 10° from the reference image data is used as delayed image data. In this case, the order of frames constituting each of the left eye image signal and the right eye image signal which are outputted from the 3D image producing apparatus is as shown in FIG. 5.

Specifically, in this case, an address from which the reference image data (the left eye image signal) is read out for each predetermined time period becomes A (n−5°) when the preceding address from which the reference image data is read out is taken as A (n°). In addition, an address from which the delayed image data (the right eye image signal) is read out for each predetermined time period becomes an address which is an angle of 10° ahead of the address from which the reference image data is read out.

When the still key 63 is depressed during the reproduction, data stored in the output frame memories 7 and 9 are continuously output at the time point, thereby to obtain a still 3D image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A three-dimensional image producing apparatus comprising:

(a) storing device for storing all rotating image data of one rotation of a subject which is composed of two-dimensional image data for each predetermined angle of rotation of the subject;

(b) a first frame memory independent of said storing device;

(c) a second frame memory independent of said storing device;

(d) means for selecting for a given time period a set of reference image data and image data delayed from the reference image data out of the rotating image data of one rotation of the subject which are stored in said storing device, for successively reading out a selected set of the image data, and for transmitting the reference image data which is read out to said first frame memory and the delayed image data which is read out to said second frame memory; and (e) outputting means for outputting one of the reference image data transmitted to said first frame memory and the delayed image data transmitted to said second frame memory as a left eye image signal and the other image data as a right eye image signal.

2. The three-dimensional image producing apparatus according to claim 1, wherein the rotating image data is produced on the basis of an image signal obtained by imaging the subject using a fixed video camera while rotating the subject.

3. The three-dimensional image producing apparatus according to claim 1, wherein the rotating image data is produced on the basis of an image signal obtained by imaging the subject using a video camera while moving the video camera so as to move around a fixed subject.

4. The three-dimensional image producing apparatus according to claim 1, wherein the delayed image data is two-dimensional image data which differs from the reference image data by a predetermined angle of rotation.

5. The three-dimensional image producing apparatus according to claim 1, wherein the reference image data and the delayed image data are read out from the storing device for each predetermined time period.

* * * * *